United States Patent
Song et al.

(10) Patent No.: US 12,124,228 B1
(45) Date of Patent: Oct. 22, 2024

(54) LEARNING CONTROL SYSTEM AND METHOD FOR NANO-PRECISION MOTION STAGE

(71) Applicant: Harbin Institute of Technology, Harbin (CN)

(72) Inventors: Fazhi Song, Harbin (CN); Kaixin Liu, Harbin (CN); Shuaiqi Chen, Harbin (CN); Yang Liu, Harbin (CN); Jiubin Tan, Harbin (CN)

(73) Assignee: Harbin Institute of Technology, Harbin (CN)

( * ) Notice: Subject to any disclaimer, the term of this patent is extended or adjusted under 35 U.S.C. 154(b) by 0 days.

(21) Appl. No.: 18/731,174

(22) Filed: May 31, 2024

(30) Foreign Application Priority Data

Jun. 25, 2023 (CN) .......... 202310751744.6

(51) Int. Cl.
    *G05B 13/02*     (2006.01)
    *G05B 19/19*     (2006.01)

(52) U.S. Cl.
    CPC ......... *G05B 13/0265* (2013.01); *G05B 19/19* (2013.01); *G05B 2219/34048* (2013.01); *G05B 2219/41439* (2013.01); *G05B 2219/41453* (2013.01)

(58) Field of Classification Search
None
See application file for complete search history.

(56) References Cited

U.S. PATENT DOCUMENTS

| | | |
|---|---|---|
| 2009/0000908 A1 | 1/2009 | Brain et al. |
| 2009/0222109 A1 | 9/2009 | Takagi |
| 2023/0118578 A1 | 4/2023 | Sreenivasan et al. |

FOREIGN PATENT DOCUMENTS

| | | |
|---|---|---|
| CN | 113485123 A | 10/2021 |
| CN | 113759721 A | 12/2021 |

*Primary Examiner* — Carlos R Ortiz Rodriguez
(74) *Attorney, Agent, or Firm* — Alex Hu

(57) ABSTRACT

A learning control system for a nano-precision motion stage comprises a closed-loop feedback section including a motion trajectory generator, a feedback controller, a motion stage, and a first Fourier transformer; and a feedforward section including a second Fourier transformer, a learning controller, an iteration backward shift operator, and a Fourier inverse transformer. An iteration experiment count j is initialized as j=1, and a j-th frequency domain feedforward signal is initialized to 0; the system is run to collect a frequency domain error signal and a frequency domain position measurement signal; a (j+1)-th frequency domain feedforward signal is updated; and an iteration experiment count j is incremented by 1. The present disclosure can effectively suppress the influence of external noise and disturbances, and improve convergence performance. Moreover, the present disclosure requires less computation, achieves simple determination of learning gains and strong robustness, and is convenient for engineering applications.

4 Claims, 6 Drawing Sheets

LEARNING CONTROL SYSTEM AND METHOD FOR NANO-PRECISION MOTION STAGE

CROSS-REFERENCE TO RELATED APPLICATIONS

This application claims priority to Chinese Patent Application No. 202310751744.6 with a filing date of Jun. 25, 2023. The content of the aforementioned application, including any intervening amendments thereto, is incorporated herein by reference.

TECHNICAL FIELD

The present disclosure relates to a motion stage control system and method, and in particular, to a learning control system and method for a nano-precision motion stage, pertaining to the field of ultra-precision equipment manufacturing technology.

BACKGROUND

With the increasing demand for high yield and high quality in production, the performance requirements for ultra-precision equipment have become increasingly stringent. Taking ultra-precision wafer stage as an example, a shorter adjustment time for a motion stage to transition from an acceleration phase to a constant speed scanning phase leads to a higher chip yield per unit time. A lower motion error during the constant speed scanning phase indicates a smaller minimum feature size, leading to higher chip quality. The demanding requirements for control performance have forced the feedback control bandwidth to approach a first-order mechanical flexible mode. However, due to limitations in the mechanical processing technology, it is difficult to further improve the mechanical flexible mode, resulting in limited feedback control bandwidth and restricting further enhancement of control performance.

High-end CNC machine tools, assembly line robots, and other high-end manufacturing equipment, due to the repetitiveness of the motion process, often use iterative learning-based feedforward control methods to assist feedback control in overcoming the shortcomings of traditional feedback control. The basic idea is to learn from control quantities and control error information generated in previous motion processes to adjust control quantities required for current motion, gradually reducing motion errors through continuous learning. However, existing iterative learning control methods generally operate in the time domain, with learning gains typically being a high-dimensional matrix. The learning algorithms have high computational complexity, making it inconvenient for practical applications. Furthermore, the learning gains in iterative learning control are generally designed based on inverse models, requiring a complex and cumbersome modeling process. Data-driven methods estimate the inverse model by measuring data during the iteration process. However, the model estimation accuracy of the existing methods is sensitive to external disturbances and measurement noise, which can affect the final convergence performance.

SUMMARY OF PRESENT INVENTION

To address the problem of limited control performance due to the sensitivity of model-based iterative learning control methods to external random noise and the inability of data-based iterative learning control methods to eliminate the impact of external repetitive disturbances on model estimation accuracy in existing ultra-precision equipment, the present disclosure provides a learning control system and method for a nano-precision motion stage, which can effectively suppress the influence of external noise and disturbances, and improve convergence performance. Moreover, the present disclosure requires less computation, achieves simple determination of learning gains and strong robustness, and is convenient for engineering applications.

To achieve the above objective, the present disclosure adopts the following technical solutions:

A learning control system for a nano-precision motion stage is provided, including a closed-loop feedback section $S_{fb}$ and a feedforward section $S_{ff}$.

The closed-loop feedback section $S_{fb}$ includes a motion trajectory generator $C_r$, a feedback controller $C_{fb}$, a motion stage P, and a first Fourier transformer $C_{ft1}$. The motion trajectory generator $C_r$ generates a desired motion trajectory $r(t)$ The desired motion trajectory $r(t)$ minus a position measurement signal $y_j(t)$ results in a motion error signal $e_j(t)$. The motion error signal $e_j(t)$ added to a feedforward signal $u_{ff,j}(t)$ results in a feedback input signal $e_{fb,j}(t)$. The feedback input signal $e_{fb,j}(t)$ is input into the feedback controller $C_{fb}$ to generate a feedback control signal $u_{fb,j}(t)$. The feedback control signal $u_{fb,j}(t)$ added to a disturbance signal $d_j(t)$ results in a total control signal $u_{all,j}(t)$. The total control signal $u_{all,j}(t)$ is input into the motion stage P to generate an actual position signal $y_{p,j}(t)$. The actual position signal $y_{p,j}(t)$ added to a measurement noise signal $v(t)$ results in a position measurement signal $y_j(t)$. The position measurement signal $y_j(t)$ is transformed into a frequency domain position measurement signal $\gamma_j(w)$ by the first Fourier transformer $C_{ft1}$.

The feedforward section $S_{ff}$ includes a second Fourier transformer $C_{ft2}$, a learning controller $C_{ILC}$, an iteration backward shift operator $C_z$, and a Fourier inverse transformer $C_{ift}$. The second Fourier transformer $C_{ft2}$ is configured to transform the motion error signal $e_j(t)$ into a frequency domain error signal $\zeta_j(w)$. The frequency domain error signal $\zeta_j(w)$ and a j-th frequency domain feedforward signal $\mu_{ff,j}(w)$ are jointly input to the learning controller $C_{ILC}$ to obtain a (j+1)-th frequency domain feedforward signal $\mu_{ff,j+1}(w)$. The (j+1)-th frequency domain feedforward signal $\mu_{ff,j+1}(w)$ is input into the iteration backward shift operator $C_z$ to generate the j-th frequency domain feedforward signal $\mu_{ff,j}(w)$. The j-th frequency domain feedforward signal $\mu_{ff,j}(w)$ is transformed into the feedforward signal $u_{ff,j}(t)$ by the Fourier inverse transformer $C_{ift}$.

The subscript j represents an iteration experiment count, $j \geq 1$, t represents time, and w represents frequency.

In one embodiment, a learning control method for a nano-precision motion stage is provided. According to this method, a learning controller $C_{ILC}$ is designed using a frequency domain iterative learning method, to determine an iteration relation of a (j+1)-th frequency domain feedforward signal $\mu_{ff,j+1}(w)$ and a j-th frequency domain feedforward signal $\mu_{ff,j}(w)$ with respect to a frequency domain error signal $\zeta_j(w)$. The learning control method includes the following steps:

step 1: initializing an iteration experiment count j as j=1, and initializing the j-th frequency domain feedforward signal $\mu_{ff,j}(w)$ to 0;

step 2: transforming the j-th frequency domain feedforward signal $\mu_{ff,j}(w)$ into the feedforward signal $u_{ff,j}(t)$ by a Fourier inverse transformer $C_{ift}$; running a closed-loop feedback section $S_{fb}$ to collect a motion error signal $e_j(t)$ and a frequency domain position measurement signal $\gamma_j(w)$; transforming the motion error signal $e_j(t)$ into the frequency domain error signal $\zeta_j(w)$ by a second Fourier transformer $C_{fft2}$; and when the motion error signal $e_j(t)$ meets a control error requirement or the iteration experiment count j reaches a set maximum value, stopping iterations; otherwise, continuing with the following steps;

step 3: updating the (j+1)-th frequency domain feedforward signal $\mu_{ff,j+1}(w)$ using a model-based approach:

$$\mu_{ff,j+1}(w) = \mu_{ff,j}(w) + \rho_j L(w) \zeta_j(w)$$

where L(w) represents a learning gain, $$\rho_j = \frac{1}{\beta_j}$$

represents a learning coefficient, and $\beta_j$ is determined as follows:

$$\beta_j = \begin{cases} \beta_1 & j=1 \\ \beta_{j-1} + \chi & j \geq 2 \end{cases}$$

where $\beta_1 \geq 1$, $\chi$ represents a conditional function; $\chi=1$ when $(E_j)^T E_{j-1} < 0$; otherwise, $\chi=0$, $E_j = [e_j(0) e_j(1) e_j(2) \ldots e_j(N-1)]^T$, and N represents the number of sampling points; and step 4: incrementing the iteration experiment count j by 1 and returning to step 2.

Compared to the prior art, the present disclosure has the following beneficial effects: Traditional iterative learning control methods are sensitive to external noise and disturbances and have poor robustness, while the present disclosure provides a learning control system and method for a nano-precision motion stage from a frequency domain perspective. An adaptive mechanism is introduced in model-based learning control to mitigate the impact of external random noise, and a differential method is used in data-based learning control to estimate an inverse model, which can effectively suppress the influence of external noise and disturbances, thereby improving convergence performance. Motion errors can be significantly reduced through a finite number of iterations. Furthermore, the present disclosure requires less computation, and achieves simple determination of learning gains and strong robustness against external noise and disturbances. A frequency domain method is employed to calculate feedforward signals, resulting in lower modeling costs. Control quantities are updated in a fully data-driven manner, which achieves nanometer-level control accuracy, making it suitable for engineering applications.

DETAILED DESCRIPTION OF THE EMBODIMENTS

The technical solutions in the embodiments of the present disclosure are clearly and completely described below with reference to the accompanying drawings in the embodiments of the present disclosure. Apparently, the described embodiments are merely a part rather than all of the embodiments of the present disclosure. All other embodiments derived from the embodiments in the present disclosure by a person of ordinary skill in the art without creative efforts should fall within the protection scope of the present disclosure.

Figure 1:
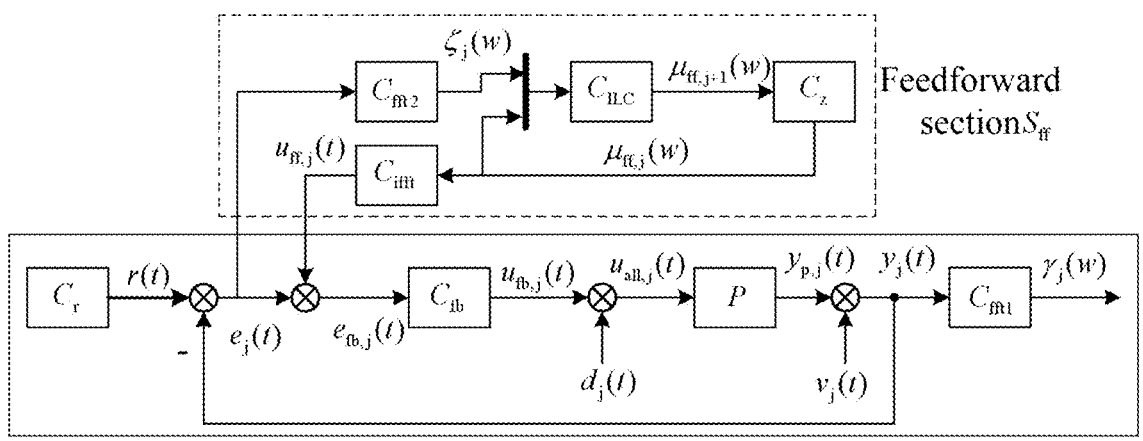
FIG. 1 is a topology diagram of a learning control system according to the present disclosure.

As shown in FIG. 1, a learning control system for a nano-precision motion stage is provided, including a closed-loop feedback section $S_{fb}$, and a feedforward section $S_{ff}$.

The closed-loop feedback section $S_{fb}$ includes a motion trajectory generator $C_r$, a feedback controller $C_{fb}$, a motion stage P, and a first Fourier transformer $C_{fft1}$. The motion trajectory generator $C_r$ generates a desired motion trajectory r(t) The desired motion trajectory r(t) minus a position measurement signal $y_j(t)$ results in a motion error signal $e_j(t)$. The motion error signal $e_j(t)$ added to a feedforward signal $u_{ff,j}(t)$ results in a feedback input signal $e_{fb,j}(t)$. The feedback input signal $e_{fb,j}(t)$ is input into the feedback controller $C_{fb}$ to generate a feedback control signal $u_{fb,j}(t)$. The feedback control signal $u_{fb,j}(t)$ added to a disturbance signal $d_j(t)$ results in a total control signal $u_{all,j}(t)$. The total control signal $u_{all,j}(t)$ is input into the motion stage P to generate an actual position signal $y_{p,j}(t)$. The actual position signal $y_{p,j}(t)$ added to a measurement noise signal $v_j(t)$ results in a position measurement signal $y_j(t)$. The position measurement signal $y_j(t)$ is transformed into a frequency domain position measurement signal $\gamma_j(w)$ by the first Fourier transformer $C_{fft1}$.

The feedforward section $S_{ff}$ includes a second Fourier transformer $C_{fft2}$, a learning controller $C_{ILC}$, an iteration backward shift operator $C_z$, and a Fourier inverse transformer $C_{ifft}$. The second Fourier transformer $C_{fft2}$ is configured to transform the motion error signal $e_j(t)$ into a frequency domain error signal $\zeta_j(w)$. The frequency domain error signal $\zeta_j(w)$ and a j-th frequency domain feedforward signal $\mu_{ff,j}(w)$ are jointly input to the learning controller $C_{ILC}$ to obtain a (j+1)-th frequency domain feedforward signal $\mu_{ff,j+1}(w)$. The (j+1)-th frequency domain feedforward signal $\mu_{ff,j+1}(w)$ is input into the iteration backward shift operator $C_z$ to generate the j-th frequency domain feedforward signal $\mu_{ff,j}(w)$. The j-th frequency domain feedforward signal $\mu_{ff,j}(w)$ is transformed into the feedforward signal $u_{ff,j}(t)$ by the Fourier inverse transformer $C_{ifft}$.

The subscript j represents an iteration experiment count, $j \geq 1$, t represents time, and w represents frequency.

As shown in FIG. 1, a learning control method for a nano-precision motion stage is provided. According to this method, a learning controller $C_{ILC}$ is designed using a frequency domain iterative learning method, to determine an iteration relation of a (j+1)-th frequency domain feedforward signal $\mu_{ff,j+1}(w)$ and a j-th frequency domain feedforward signal $\mu_{ff,j}(w)$ with respect to a frequency domain error signal $\zeta_j(w)$. The learning control method includes the following steps:

In step 1, an iteration experiment count j is initialized as j=1, and the j-th frequency domain feedforward signal $\mu_{ff,j}(w)$ is initialized to 0.

In step 2, the j-th frequency domain feedforward signal $\mu_{ff,j}(w)$ is transformed into a feedforward signal $u_{ff,j}(t)$ by a Fourier inverse transformer $C_{ifft}$; a closed-loop feedback section $S_{fb}$ is run to collect a motion error signal $e_j(t)$ and a frequency domain position measurement signal $\gamma_j(w)$; the motion error signal $e_j(t)$ is transformed into the frequency domain error signal $\zeta_j(w)$ by a second Fourier transformer $C_{fft2}$; and when the motion error signal $e_j(t)$ meets a control error requirement or the iteration experiment count j reaches a set maximum value, iterations are stopped; otherwise, the following steps are performed.

In step 3, the (j+1)-th frequency domain feedforward signal $\mu_{ff,j+1}$ (w) is updated using a model-based approach:

$$\mu_{ff,j+1}(w) = \mu_{ff,j}(w) + \rho_j L(w)\zeta_j(w)$$

where L(w) represents a learning gain, $$\rho_j = \frac{1}{\beta_j}$$

represents a learning coefficient, and $\beta_j$ is determined as follows:

$$\beta_j = \begin{cases} \beta_1 & j=1 \\ \beta_{j-1} + \chi & j \geq 2 \end{cases}$$

where $\beta_1 \geq 1$, $\chi$ represents a conditional function; $\chi=1$ when $(E_j)^T E_{j-1} < 0$; otherwise, $\chi=0$, $E_j=[e_j(0)e_j(1)e_j(2) \ldots e_j(N-1)]^T$, and N represents the number of sampling points.

The learning gain L(w) is determined in the following manner:

When frequency domain models of the motion stage P and the feedback controller $C_{fb}$ are known $L(w) = \left(\frac{P(w)C_{fb}(w)}{1+P(w)C_{fb}(w)}\right)^{-1}$, where P(w) is the frequency domain model of the motion stage P and $C_{fb}(w)$ is the frequency domain model of the feedback controller $C_{fb}$.

When the frequency domain models of the motion stage P and the feedback controller $C_{fb}$ are unknown, L(w) is determined through frequency sweep before step 1: setting the feedforward signal $u_{ff,j}(t)$ to zero, generating a white noise signal $r_n(t)$ by using the motion trajectory generator $C_r$, with a signal length of the white noise signal $r_n(t)$ being the same as the length of the desired motion trajectory r(t), and running the closed-loop feedback section $S_{fb}$ to collect a frequency domain position measurement signal $\gamma_n(w)$ under the white noise signal, where $$L(w) = \frac{r_n(w)}{\gamma_n(w)},$$

and $r_n(w)$ is a frequency domain signal obtained after Fourier transformation of the white noise signal $r_n(t)$; and after L(w) is obtained, generating the desired motion trajectory r(t) using the motion trajectory generator $C_r$, and then performing step 1.

In step 4, the iteration experiment count j is incremented by 1 and step 2 is then performed.

Additionally, when frequency domain models of the motion stage P and/or the feedback controller $C_{fb}$ are unknown and frequency sweep experiments are not feasible, the (j+1)-th frequency domain feedforward signal $\mu_{ff,j+1}(w)$ can be updated using a data-based approach in step 3:

$$\mu_{ff,j+1}(w) = \begin{cases} \frac{\zeta_j(w)}{\gamma_j(w)}r(w) & j=1 \\ \mu_{ff,j}(w) + \sigma_j \frac{\mu_{ff,j}(w) - \mu_{ff,j-1}(w)}{\gamma_j(w) - \gamma_{j-1}(w)}\zeta_j(w) & j \geq 2 \end{cases}$$

where $0 < \sigma_j \leq 1$, and r(w) is a frequency domain signal obtained after Fourier transformation of the desired motion trajectory r(t).

Embodiment

Figure 2:
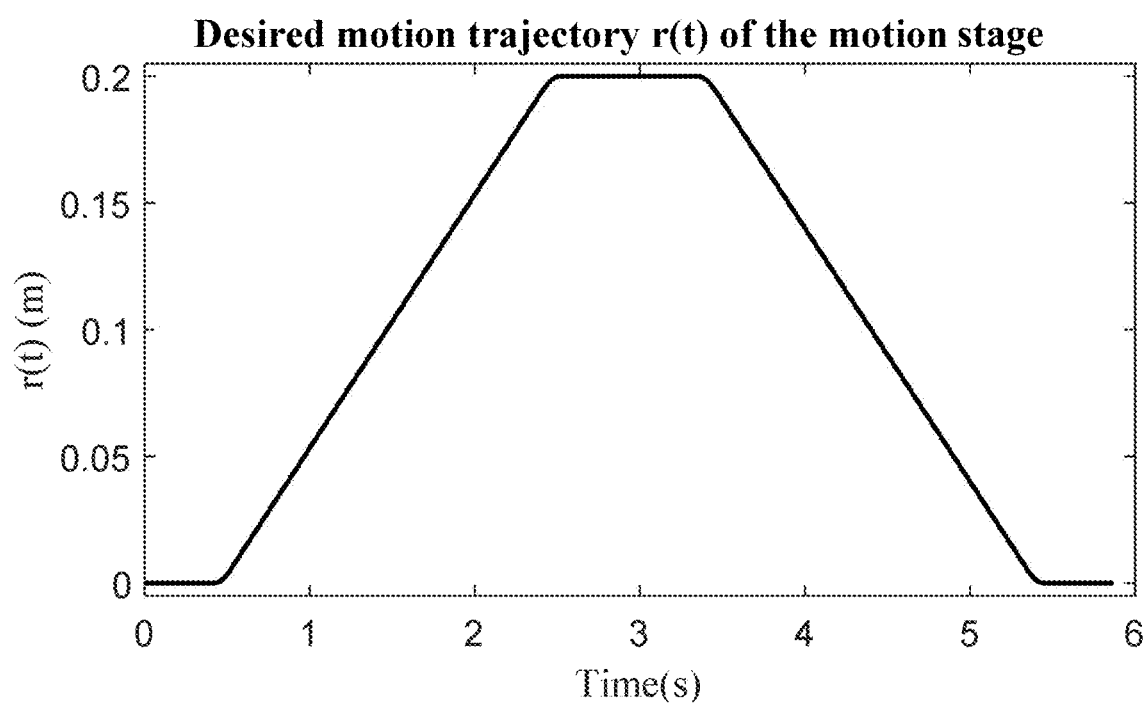
FIG. 2 illustrates a desired motion trajectory of a motion stage in a simulation according to an embodiment.

In this embodiment, the motion trajectory generator $C_r$ is a $5^{th}$-order S-shaped motion trajectory generator. The desired motion trajectory r(t) generated by the motion stage P is as shown in FIG. 2. Mathematical models $C_{fb}(s)$ and P(s) of the feedback controller $C_{fb}$ and the motion stage P are as follows:

$$C_b(s) = \frac{1.508 \times 10^5 s^2 + 2.069 \times 10^7 s + 3.943 \times 10^8}{0.001159 s^2 + s}$$

$$P(s) = \frac{\begin{array}{l}0.0729s^6 + 38.58s^5 + 3.82 \times 10^6 s^4 + \\ 9.95 \times 10^8 s^3 + 4.12 \times 10^{13} s^2 + 3.60 \times 10^{15} s + 4.4 \times 10^{19}\end{array}}{\begin{array}{l}24s^8 + 1.39 \times 10^4 s^7 + 1.4 \times 10^9 s^6 + 3.92 \times 10^{11} s^5 + \\ 1.55 \times 10^{16} s^4 + 1.73 \times 10^{18} s^3 + 2.1 \times 10^{22} s^2\end{array}}$$

where s represents a Laplace operator, and by replacing s with iw (i is an imaginary unit), frequency domain models $C_{fb}(w)$ and P(w) of the feedback controller $C_{fb}$ and the motion stage P are obtained.

The measurement noise signal $v_j(t)$ is a white noise signal with a variance of $0.1 \times 10^{-9}$ and a mean of 0. The disturbance signal $d_j(t)$ is a signal that is periodic with respect to an actual position signal $y_{p,j}(t)$, used to simulate disturbances such as cable force disturbances, actuator torque fluctuations, and other disturbing forces present in real scenarios.

A learning controller $C_{ILC}$ is designed using a frequency domain iterative learning method to correct the feedforward signal $u_{ff,j}(t)$ through iteration experiments, in order to gradually reduce the motion error signal $e_j(t)$, as detailed below:

In step 1, an iteration experiment count j is initialized as j=1, and the j-th frequency domain feedforward signal $\mu_{ff,j}$ (w) is initialized to 0. In this case, the feedforward signal $u_{ff,j}(t)$ is zero, the feedforward section $S_{ff}$ is inactive, and the learning control system consists of the closed-loop feedback section $S_{fb}$ only.

In step 2, the j-th frequency domain feedforward signal $\mu_{ff,j}(w)$ is transformed into a feedforward signal $u_{ff,j}(t)$ by a Fourier inverse transformer $C_{ifft}$; a closed-loop feedback section $S_{fb}$ is run to collect a motion error signal $e_j(t)$ and a frequency domain position measurement signal $y_j(w)$; the motion error signal $e_j(t)$ is transformed into the frequency domain error signal $\zeta_j(w)$ by a second Fourier transformer $C_{fft2}$; and when the motion error signal $e_j(t)$ meets a control error requirement or the iteration experiment count j reaches a set maximum value, iterations are stopped; otherwise, the following steps are performed. In this embodiment, the maximum iteration count is set to 50.

In step 3, the (j+1)-th frequency domain feedforward signal $\mu_{ff,j+1}(w)$ is updated using a model-based approach:

$$\mu_{ff,j+1}(w) = \mu_{ff,j}(w) + \rho_j L(w)\zeta_j(w)$$

where L(w) represents a learning gain, $$\rho_j = \frac{1}{\beta_j}$$

represents a learning coefficient, and $\beta_j$ is determined as follows:

$$\beta_j = \begin{cases} \beta_1 & j = 1 \\ \beta_{j-1} + \chi & j \geq 2 \end{cases}$$

where $\beta_1 \geq 1$, $\chi$ represents a conditional function; $\chi=1$ when $(E_j)^T E_{j-1} < 0$; otherwise, $\chi=0$, $E_j=[e_j(0)e_j(1)e_j(2) \ldots e_j(N-1)]^T$, and N represents the number of sampling points; in this embodiment, $\beta_1=1.5$.

Simulations are conducted using a model-based approach and a data-based approach, which are specifically as follows:

1. In the model-based approach, when the frequency domain models of the motion stage P and the feedback controller $C_{fb}$ are known, the learning gain is as follows:

$$L(w) = \left(\frac{P(w)C_{fb}(w)}{1 + P(w)C_{fb}(w)}\right)^{-1},$$

where P(w) is the frequency domain model of the motion stage P and $C_{fb}(w)$ is the frequency domain model of the feedback controller $C_{fb}$.

Since the exact model P(w) is usually unknown in real scenarios, an approximate model of P(w) is used in this embodiment as follows:

$$P(w) = \frac{1.312s^2 + 95.5s + 1.425 \times 10^6}{480s^4 + 4.584 \times 10^4 s^3 + 6.841 \times 10^8 s^2}\bigg|_{s=iw}$$

2. In the data-based approach, when the frequency domain models of the motion stage P and/or the feedback controller $C_{fb}$ are unknown and frequency sweep experiments are not feasible, the (j+1)-th frequency domain feedforward signal $\mu_{ff,j+1}(w)$ is updated as follows:

$$\mu_{ff,j+1}(w) = \begin{cases} \frac{\zeta_j(w)}{\gamma_j(w)} r(w) & j = 1 \\ \mu_{ff,j}(w) + \sigma_j \frac{\mu_{ff,j}(w) - \mu_{ff,j-1}(w)}{\gamma_j(w) - \gamma_{j-1}(w)} \zeta_j(w) & j \geq 2 \end{cases}$$

where $0 < \sigma_j \leq 1$, and r(w) is a frequency domain signal obtained after Fourier transformation of the desired motion trajectory r(t); in this embodiment, $\sigma_j=0.9$.

In step 4, the iteration experiment count j is incremented by 1 and step 2 is then performed.

Figure 3:
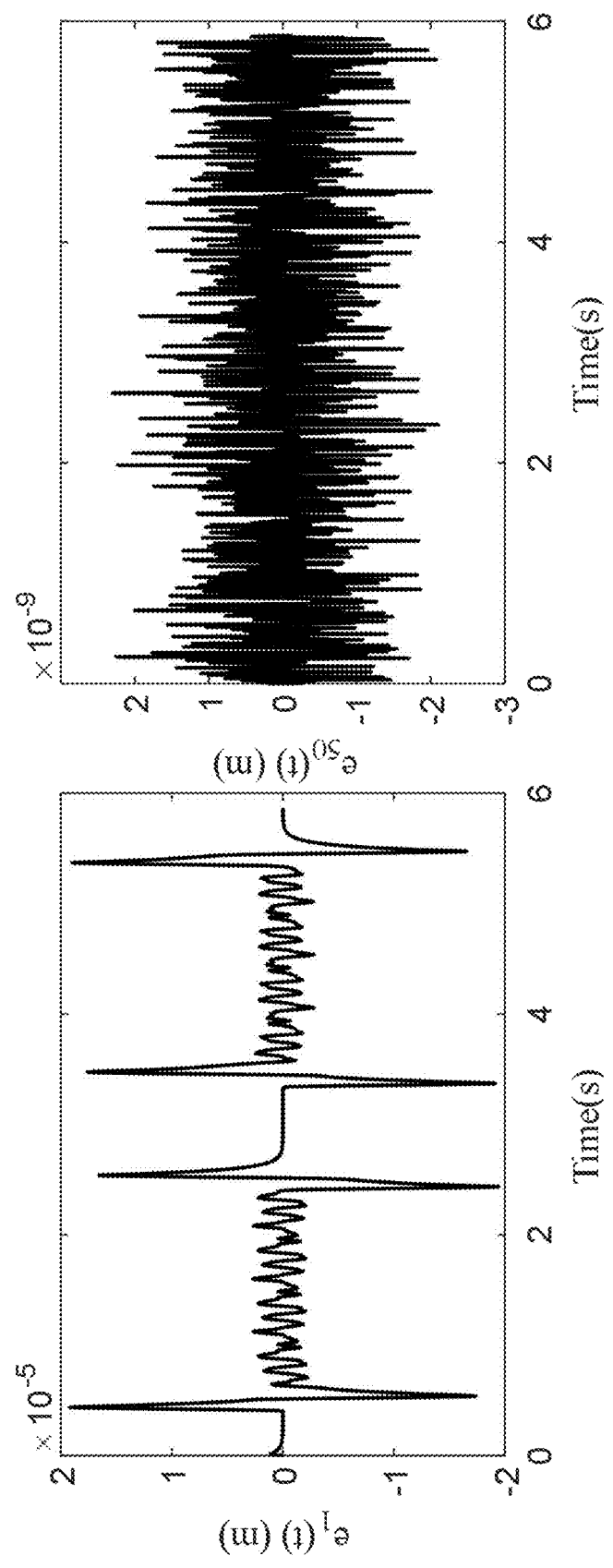
FIG. 3 shows simulation results of a model-based learning control method according to an embodiment.
Figure 4:
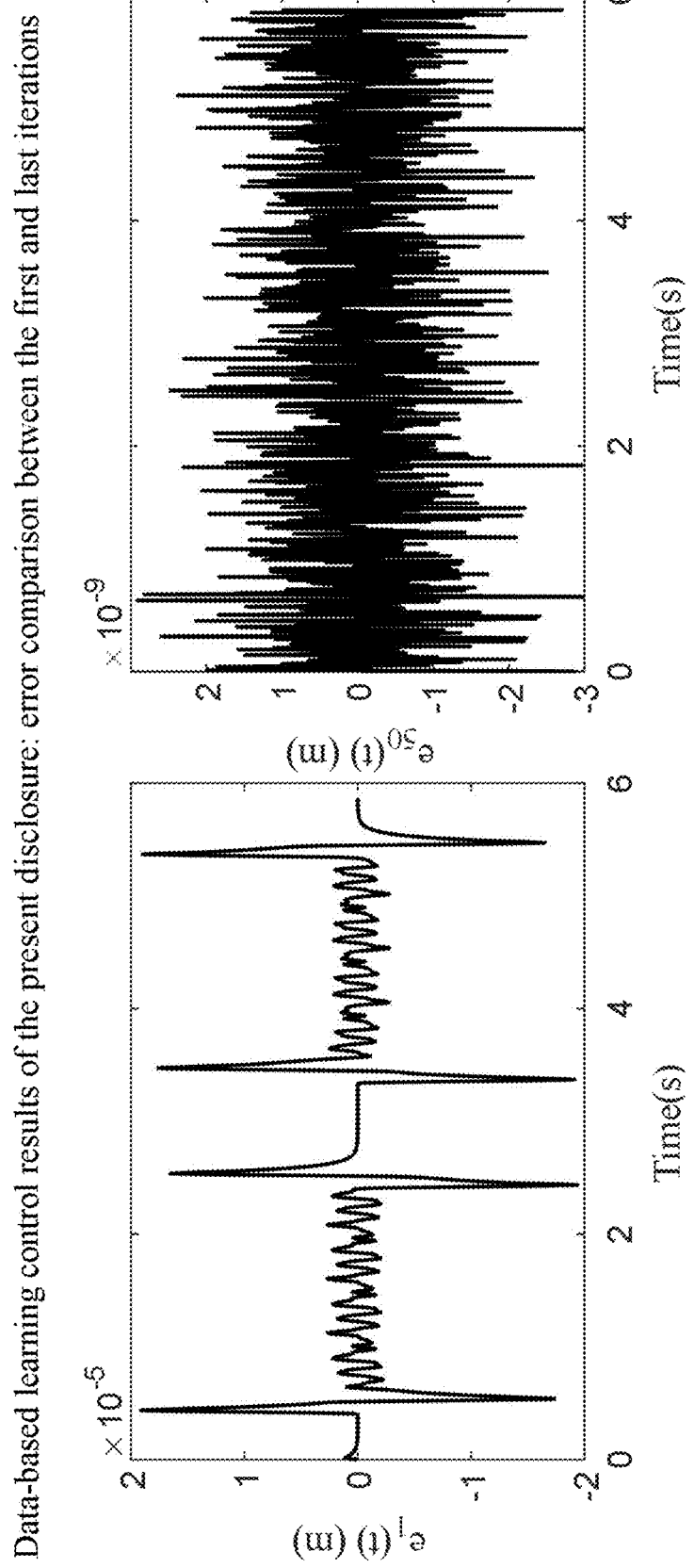
FIG. 4 shows simulation results of a data-based learning control method according to an embodiment.

Ultimately, simulation results of the model-based approach are shown in FIG. 3, while simulation results of the data-based approach are shown in FIG. 4. It can be observed that through multiple iterations, both the model-based learning control method and the data-based learning control method in the present disclosure significantly reduce the motion error, from the micron level to the nanometer level.

Figure 5:
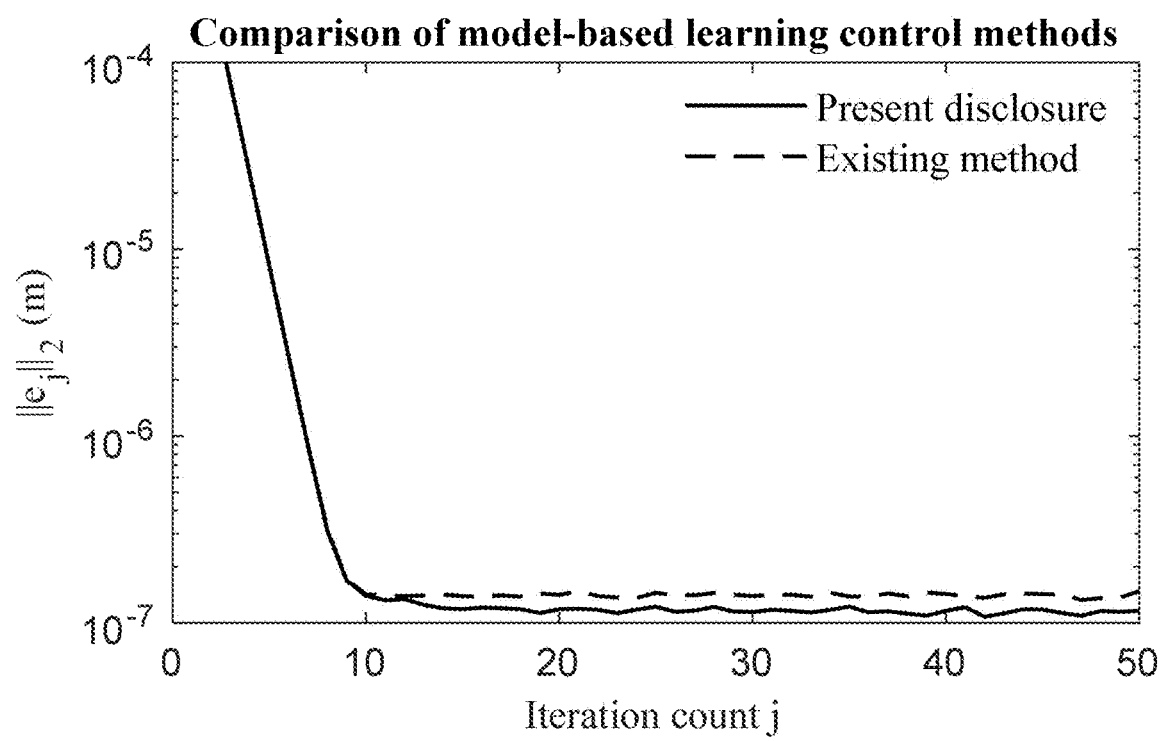
FIG. 5 shows a comparison between simulation results of a model-based learning control method and an existing method according to an embodiment.

Comparing the model-based learning control method of the present disclosure with the existing model-based frequency domain learning control method, as shown in FIG. 5, it is evident that beyond the $10^{th}$ iteration experiment, the present disclosure can further reduce the motion error compared to the existing method. This is primarily due to the adaptive learning gain designed in the present disclosure, which can further mitigate the impact of external random noise on the learning control effect.

Figure 6:
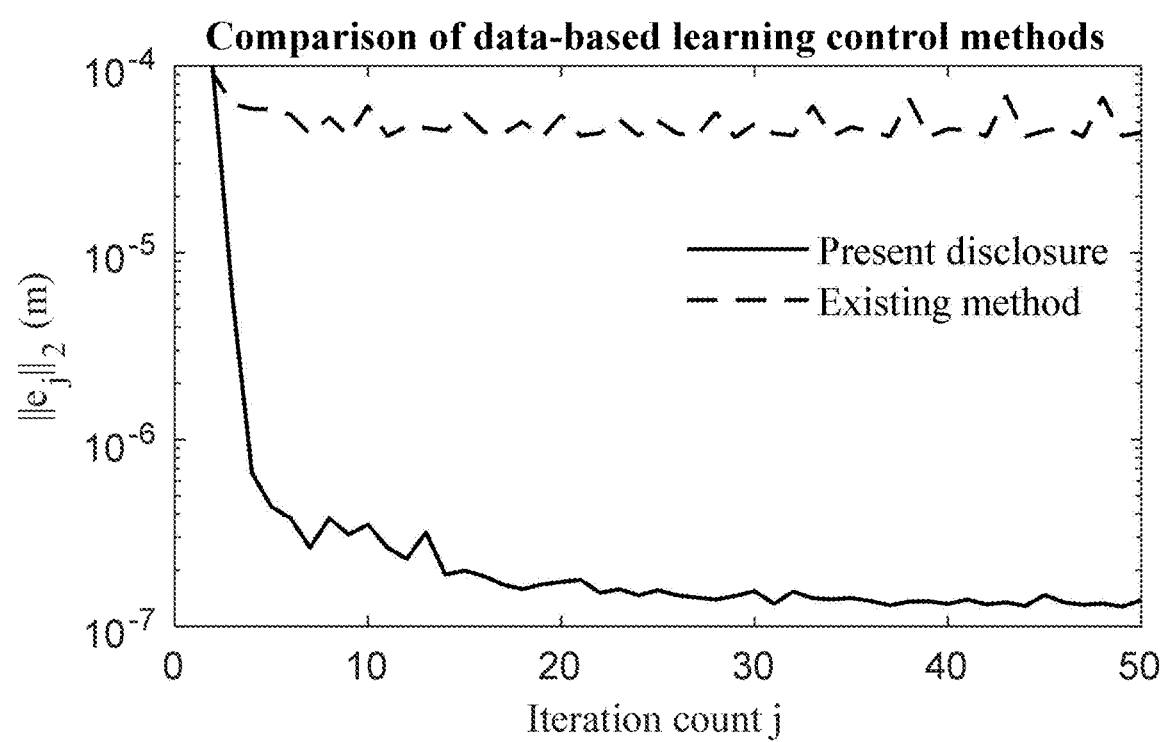
FIG. 6 shows a comparison between simulation results of a data-based learning control method and an existing method according to an embodiment.

Comparing the data-based learning control method of the present disclosure with the existing data-based frequency domain learning control method, as shown in FIG. 6, it is evident that even without using model information, the present disclosure can still significantly reduce motion errors. Moreover, under the influence of external periodic disturbances, the present disclosure can achieve smaller motion errors compared to the existing method. This is mainly because the present disclosure employs a differential approach, which can reduce the impact of periodic disturbances on the accuracy of learning gain estimation.

With reference to the results shown in FIG. 3 to FIG. 6 it can be seen that under the influence of random noise and external disturbances, the present disclosure can achieve higher control precision compared to the existing methods.

It will be apparent to those skilled in the art that the present disclosure is not limited to the details of the exemplary embodiments described above, but that the present disclosure can be embodied in other specific forms without departing from the spirit or essential characteristics of the present disclosure. Accordingly, the embodiments should be regarded in all points of view as exemplary and not restrictive, the scope of the present disclosure being defined by the appended claims rather than the foregoing description, and it is therefore intended that all changes falling within the meaning and scope of equivalent elements of the claims should be included in the present disclosure. Any reference numerals in the claims should not be considered as limiting the involved claims.

In addition, it should be understood that although this specification is described in accordance with the implementations, not each implementation only contains an independent technical solution, and this description in the specification is only for clarity. Those skilled in the art should take the specification as a whole. The technical solutions in the embodiments can also be properly combined to form other implementations that can be understood by those skilled in the art.

What is claimed is:

1. A learning control system for a nano-precision motion stage, comprising a closed-loop feedback section $S_{fb}$, and a feedforward section $S_{ff}$;
wherein the closed-loop feedback section $S_{fb}$ comprises a motion trajectory generator $C_r$, a feedback controller $C_{fb}$, a motion stage P, and a first Fourier transformer $C_{ff1}$; the motion trajectory generator $C_r$ generates a desired motion trajectory r(t); the desired motion trajectory r(t) minus a position measurement signal $y_j(t)$ results in a motion error signal $e_j(t)$; the motion error signal $e_j(t)$ added to a feedforward signal $u_{ff,j}(t)$ results in a feedback input signal $e_{fb,j}(t)$; the feedback input signal $e_{fb,j}(t)$ is input into the feedback controller $C_{fb}$ to generate a feedback control signal $u_{fb,j}(t)$; the feedback control signal $u_{fb,j}(t)$ added to a disturbance signal $d_j(t)$ results in a total control signal $u_{all,j}(t)$; the total control signal $u_{all,j}(t)$ is transmitted to the motion stage P to generate an actual position signal $y_{p,j}(t)$; the actual position signal $y_{p,j}(t)$ added to a measurement noise signal $v_j(t)$ results in a position measurement signal $y_j(t)$; and the position measurement signal $y_j(t)$ is transformed into a frequency domain position measurement signal $\gamma_j(w)$ by the first Fourier transformer $C_{fft1}$;

the feedforward section $S_{ff}$ comprises a second Fourier transformer $C_{fft2}$, a learning controller $C_{ILC}$, an iteration backward shift operator $C_z$, and a Fourier inverse transformer $C_{ifft}$; the second Fourier transformer $C_{fft2}$ is configured to transform the motion error signal $e_j(t)$ to a frequency domain error signal $\zeta_j(w)$; the frequency domain error signal $\zeta_j(w)$ and a j-th frequency domain feedforward signal $\mu_{ff,j}(w)$ are jointly input to the learning controller $C_{ILC}$ to obtain a (j+1)-th frequency domain feedforward signal $\mu_{ff,j+1}(w)$; the (j+1)-th frequency domain feedforward signal $\mu_{ff,j+1}(w)$ is input into the iteration backward shift operator $C_z$ to generate the j-th frequency domain feedforward signal $\mu_{ff,j}(w)$; and the j-th frequency domain feedforward signal $\mu_{ff,j}(w)$ is transformed into the feedforward signal $u_{ff,j}(t)$ by the Fourier inverse transformer $C_{ifft}$; and j represents an iteration experiment count, j≥1, t represents time, and w represents frequency.

2. A learning control method for a nano-precision motion stage, wherein in the system according to claim 1, a learning controller $C_{ILC}$ is designed using a frequency domain iterative learning method, to determine an iteration relation of the (j+1)-th frequency domain feedforward signal $\mu_{ff,j+1}(w)$ and the j-th frequency domain feedforward signal $\mu_{ff,j}(w)$ with respect to the frequency domain error signal $\zeta_j(w)$, and the learning control method comprising the following steps:

step 1: initializing an iteration experiment count j as j=1, and initializing the j-th frequency domain feedforward signal $\mu_{ff,j}(w)$ to 0;

step 2: transforming the j-th frequency domain feedforward signal $\mu_{ff,j}(w)$ into the feedforward signal $u_{ff,j}(t)$ by the Fourier inverse transformer $C_{ifft}$; running the closed-loop feedback section $S_{fb}$ to collect the motion error signal $e_j(t)$ and the frequency domain position measurement signal $\gamma_j(w)$; transforming the motion error signal $e_j(t)$ into the frequency domain error signal $\zeta_j(w)$ by the second Fourier transformer $C_{fft2}$; and when the motion error signal $e_j(t)$ meets a control error requirement or the iteration experiment count j reaches a set maximum value, stopping iterations; otherwise, continuing with the following steps;

step 3: updating the (j+1)-th frequency domain feedforward signal $\mu_{ff,j+1}(w)$ using a model-based approach:

$$\mu_{ff,j+1}(w) = \mu_{ff,j}(w) + \rho_j L(w) \zeta_j(w)$$

wherein L(w) represents a learning gain, $$\rho_j = \frac{1}{\beta_j}$$

represents a learning coefficient, and $\beta_j$ is determined as follows:

$$\beta_j = \begin{cases} \beta_1 & j=1 \\ \beta_{j-1} + \chi & j \geq 2 \end{cases}$$

wherein $\beta_1 \geq 1$, $\chi$ represents a conditional function; $\chi=1$ when $(E_j)^T E_{j-1} < 0$; otherwise, $\chi=0$, $E_j = [e_j(0)\ e_j(1)\ e_j(2)\ \ldots\ e_j(N-1)]^T$, and N represents a number of sampling points; and step 4: incrementing the iteration experiment count j by 1 and returning to step 2.

3. The learning control method according to claim 2, wherein the learning gain L(w) in step 3 is determined as follows:

when frequency domain models of the motion stage P and the feedback controller $C_{fb}$ are known, $$L(w) = \left( \frac{P(w) C_{fb}(w)}{1 + P(w) C_{fb}(w)} \right)^1,$$

wherein P(w) is the frequency domain model of the motion stage P and $C_{fb}(w)$ is the frequency domain model of the feedback controller $C_{fb}$; and when the frequency domain models of the motion stage P and the feedback controller $C_{fb}$ are unknown, L(w) is determined through frequency sweep before step 1: setting the feedforward signal $u_{ff,j}(t)$ to zero, generating a white noise signal $r_n(t)$ by using the motion trajectory generator $C_r$, with a signal length of the white noise signal $r_n(t)$ being identical to a length of the desired motion trajectory r(t), and running the closed-loop feedback section $S_{fb}$ to collect the frequency domain position measurement signal $\gamma_n(w)$ under the white noise signal, wherein $$L(w) = \frac{r_n(w)}{\gamma_n(w)},$$

and $r_n(w)$ is a frequency domain signal obtained after Fourier transformation of the white noise signal $r_n(t)$; and after L(w) is obtained, generating the desired motion trajectory r(t) using the motion trajectory generator $C_r$, and then performing step 1.

4. The learning control method according to claim 2, wherein when frequency domain models of the motion stage P and/or the feedback controller $C_{fb}$ are unknown and frequency sweep experiments are not feasible in step 3, the (j+1)-th frequency domain feedforward signal $\mu_{ff,j+1}(w)$ is updated using a data-based approach:

$$\mu_{ff,j+1}(w) = \begin{cases} \dfrac{\zeta_j(w)}{\gamma_j(w)} r(w) & j=1 \\ \mu_{ff,j}(w) + \sigma_j \dfrac{\mu_{ff,j}(w) - \mu_{ff,j-1}(w)}{\gamma_j(w) - \gamma_{j-1}(w)} \zeta_j(w) & j \geq 2 \end{cases}$$

wherein $0 < \sigma_j \leq 1$, and r(w) is a frequency domain signal obtained after Fourier transformation of the desired motion trajectory r(t).

* * * * *